United States Patent [19]

Campbell et al.

[11] 4,131,437
[45] Dec. 26, 1978

[54] PROCESS FOR THE CONTINUOUS MULTISTAGE DEGASIFICATION OF LIQUID SULFUR

[75] Inventors: Thomas M. Campbell, Baytown, Tex.; William H. Ringler, Morristown; Howard Lerner, Parsippany, both of N.J.

[73] Assignee: Exxon Research & Engineering Co., Florham Park, N.J.

[21] Appl. No.: 810,916

[22] Filed: Jun. 29, 1977

Related U.S. Application Data

[63] Continuation-in-part of Ser. No. 642,346, Dec. 19, 1975, abandoned.

[51] Int. Cl.² .............................................. B01D 19/00
[52] U.S. Cl. .................................... 55/53; 423/578 R
[58] Field of Search ..................... 55/36, 52, 53, 193, 55/196; 423/567, 573, 578

[56] References Cited

U.S. PATENT DOCUMENTS

| | | | |
|---|---|---|---|
| 2,092,625 | 9/1937 | Rich | 423/528 |
| 2,169,261 | 8/1939 | Lee et al. | 423/578 |
| 3,364,655 | 1/1968 | Solenhac | 55/52 |
| 3,920,424 | 11/1975 | Estep et al. | 55/52 X |

FOREIGN PATENT DOCUMENTS

| | | | |
|---|---|---|---|
| 548780 | 11/1957 | Canada | 423/578 |
| 1402274 | 8/1975 | United Kingdom | 423/578 |

Primary Examiner—Frank A. Spear, Jr.
Assistant Examiner—Richard W. Burks
Attorney, Agent, or Firm—John W. Ditsler

[57] ABSTRACT

$H_2S$ is removed continuously from $H_2S$-rich liquid sulfur by contacting same with an $H_2S$-lean carrier gas in more than one discrete contacting stage. Preferably, the liquid sulfur is recirculated in at least one discrete contacting stage to provide better contacting between the sulfur and the carrier gas within said stage.

15 Claims, 2 Drawing Figures

PROCESS FOR THE CONTINUOUS MULTISTAGE DEGASIFICATION OF LIQUID SULFUR

CROSS REFERENCE TO RELATED APPLICATIONS

This is a continuation-in-part of application Ser. No. 642,346, filed Dec. 19, 1975 and now abandoned.

BACKGROUND OF THE INVENTION

1. Field of the Invention

This invention relates to a process for degasifying sulfur. More particularly, this invention relates to a multistage process for continuously removing $H_2S$ from $H_2S$-rich liquid sulfur.

2. Description of the Prior Art

In several petroleum refining processes, sulfur is removed from various hydrocarbon materials by reaction with hydrogen to form $H_2S$. $H_2S$ is also present in sour natural gas. In either case, the $H_2S$ is usually removed therefrom by absorption in a solution of an alkanolamine and subsequently released in concentrated form when the solution is heated. The $H_2S$ may then be converted to elemental sulfur by the well known Claus process (see Kirk Othmer, The Encyclopedia of Chemical Technology, 2nd Ed., Vol. 4, p. 376-377, 1964, and Vol. 19, p. 353-354, 1969). Briefly, in this process, part (about ⅓) of the concentrated $H_2S$ is combusted with air to form $SO_2$ which then reacts with the remaining $H_2S$ at about 300° C. in the presence of a catalyst to form gaseous sulfur. Typically, three stages of combustion, i.e. $H_2S$ conversion, are employed, each stage operating at a progressively lower temperature and containing progressively reduced amounts of $H_2S$, such that the conversion to sulfur approaches equilibrium. Using three stages, about 95% of the $H_2S$ in the gas feed to the Claus plant is converted to sulfur. Following each stage, the sulfur is cooled and the three liquid sulfur streams thus formed are combined into an $H_2S$-rich liquid sulfur stream which is then passed to a sulfur pit which serves to store the sulfur until further disposition. Typically, the $H_2S$-rich liquid sulfur will contain from about 70 to about 300 wppm $H_2S$, including hydrogen polysulfides having the formula $H_2S_x$ where x ranges from 1-6. For the sake of convenience, the $H_2S$ equivalent to the $H_2S$ present in the $H_2S$ lean liquid sulfur as $H_2S$ and as $H_2S_x$ will be termed hereinafter "equivalent $H_2S$."

Aside from being a noxious gas in relatively dilute concentrations, $H_2S$ becomes progressively dangerous as its concentration in a gas exceeds about 70 wppm, the fatal concentration for man being about 700 wppm. When the $H_2S$ content of a gas increases to at least 3.6 volume % (which corresponds to an equilibrium value of 15 wppm $H_2S$ in liquid sulfur) in the presence of an oxygen-containing gas such as air, the inflammability threshold of the gas will be exceeded. In addition, should liquid sulfur be confined in a vessel having iron as a material of construction, the iron sulfide formed on the inner walls thereof may be pyrophoric and, in the presence of an oxygen-containing gas, may result in spontaneous ignition of $H_2S$ without any flame or spark being present. Thus, it is desirable to maintain the concentration of equivalent $H_2S$ in liquid sulfur below 15 wppm.

One method for removing $H_2S$ from $H_2S$-rich liquid sulfur has been suggested in U.S. Pat. No. 3,364,655. According to the method disclosed therein, a batch of the sulfur is passed into a separate degasification vessel and recirculated through spray nozzles such that the sulfur spray thus formed is contacted with a gas in the vapor space above the liquid sulfur. However, this process requires expenditures for a separate degasification vessel and suffers from the economic and operational disadvantages normally associated with most batch processes, e.g. not supplying a product continuously, larger storage requirements during processing, more operator attention and/or instrumentation, increased maintenance and the like.

Another method for removing $H_2S$ from $H_2S$-rich liquid sulfur is disclosed in U.S. Pat. No. 3,920,424. According to the process described therein, a batch of $H_2S$-rich liquid sulfur is recirculated continuously from a storage tank through a vertical gas scrubbing apparatus until the desired $H_2S$ content of the liquid sulfur has been obtained. The scrubbing apparatus contains baffle plates which serve to increase the surface area of the downwardly flowing liquid sulfur, thereby facilitating the escape of the $H_2S$ from the sulfur. Again, however, this process suffers from the disadvantages associated with most batch processes.

Yet another method for degasifying liquid sulfur is disclosed in British Pat. No. 1,402,274 wherein a single stage continuous process is employed. However, it is believed that the present multistage process is not suggested by the prior art.

SUMMARY OF THE INVENTION

Now according to the present invention, $H_2S$ may be removed continuously from $H_2S$-rich liquid sulfur, such as might be obtained from a Claus plant, by contacting said sulfur with an $H_2S$-lean carrier gas in a contacting zone containing more than one discrete contacting stage. In a preferred embodiment of the present invention, the sulfur is recirculated within at least one contacting stage; e.g., through spray nozzles, to promote contacting of the sulfur with the carrier gas within said contacting stage, thereby effecting degasification of said sulfur. The $H_2S$ evolved during degasification is removed continuously via the carrier gas and discharged in the form of an $H_2S$-rich carrier gas. The carrier gas may be passed either concurrent or countercurrent to the flow of the sulfur. If desired, ammonia can be added to the recirculated sulfur during degasification to hasten the decomposition of hydrogen polysulfides present therein to $H_2S$. A sulfur pit commonly employed to store the effluent from a process which forms liquid sulfur (e.g., a Claus process) is a particularly well suited contacting zone for the practice of the present invention.

DESCRIPTION OF THE PREFERRED EMBODIMENT

Having thus described the invention in general terms reference is now made to the Figures. It is to be understood that the Figures are shown only for the purpose of illustrating the present invention. Such details are included as are necessary for a clear understanding of how the present invention may be applied to said system. No intention is made to unduly limit the scope of the present invention to the particular configuration shown as other configurations are contemplated. Various items such as steam lines, instrumentation and other process equipment and control means peripheral to the present invention have been omitted therefrom for the sake of simplicity. Variations obvious to those having ordinary skill in the art of degasification of liquid sulfur are included within the broad scope of the present invention.

Figure 1:
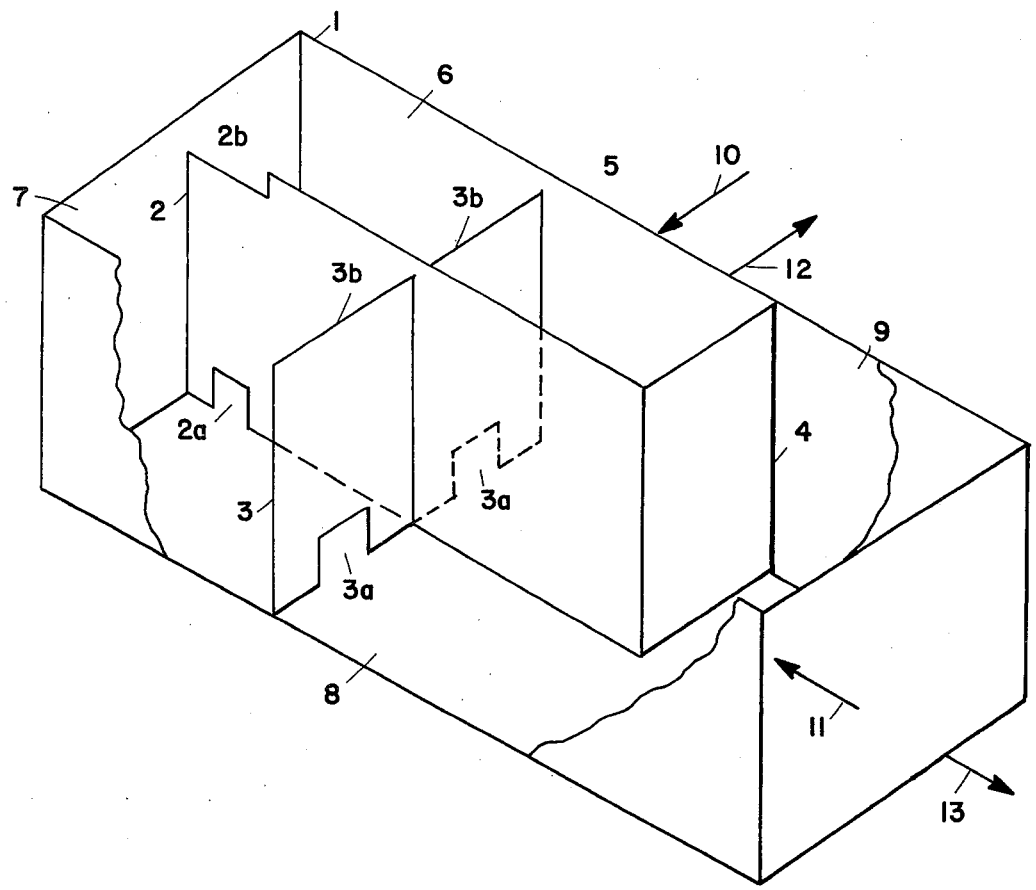
FIG. 1 diagrammatically depicts an isometric view showing one embodiment of the present invention.

Referring now to FIG. 1, there is shown a sulfur pit 1 which contains the effluent from a process for forming liquid sulfur from $H_2S$, i.e. the Claus process. The sulfur pit shown is subdivided into separate compartments or discrete contacting stages by an internal baffling arrangement comprising Sections 2, 3 and 4. Section 2 extends longitudinally from about the midpoint of one transverse wall of the sulfur pit 1 toward the opposite wall until it intersects Section 4. Section 4 is perpendicular to Section 2 and extends from said intersection to one longitudinal wall as shown. Section 3 is parallel to Section 4 and bisects Section 2 near its midpoint. All sections are sealed to the walls of the sulfur pit except at openings 2a, 2b, 3a and 3b. Thus, as shown, the baffling arrangement forms first contacting stage 5, second contacting stage 6, third contacting stage 7, and fourth contacting stage 8. A collecting Section 9 is formed by Section 4 and one transverse wall as shown. $H_2S$-rich liquid sulfur is introduced continuously into first contacting stage 5 via line 10 and passes sequentially through stages 5, 6, 7 and 8, countercurrent to an $H_2S$-lean carrier gas which is introduced continuously into the sulfur pit via line 11. An $H_2S$-rich carrier gas and $H_2S$-lean liquid sulfur product are then withdrawn continuously from sulfur pit 1 via lines 12 and 13, respectively.

The $H_2S$-rich liquid sulfur may be obtained from any convenient source such as a Claus plant. The amount of $H_2S$ present in the liquid sulfur is not critical and may range broadly. However, in general, the liquid sulfur will contain at least 70 wppm equivalent $H_2S$ and typically will contain from about 100 to about 300 wppm equivalent $H_2S$. However, the hydrogen polysulfides present therein are rather unstable and will decompose to form $H_2S$ during degasification. The temperature of the sulfur entering the sulfur pit is not critical provided it is maintained in a range to avoid undesirable viscosity effects (see F. J. Touro and T. K. Wiewiorowski, J. Physical Chemistry, Vol. 70, No. 1, p. 239–241, 1966).

The $H_2S$-lean carrier gas may be any gas that will not react unfavorably with the sulfur. Examples of a suitable carrier gas include an inert gas such as nitrogen, air, steam, Claus plant tail gas and the like. Thus, the $H_2S$-lean carrier gas may or may not contain $H_2S$. However, any $H_2S$ present therein should be in amounts that do not exceed the amount in equilibrium with the desired level of $H_2S$ in the sulfur (Equilibrium information on the sulfur-$H_2S$ system is available in T. K. Wiewiorowski and F. J. Touro, J. of Physical Chemistry, Vol. 70, No. 1, p. 234–238, 1966). If desired, the $H_2S$-lean carrier gas may be passed in concurrent flow with, rather than in countercurrent flow to, the sulfur. However, countercurrent flow is preferred to minimize the amount of purge gas required. The rate at which the $H_2S$-lean carrier gas in line 11 is introduced into the sulfur pit 1 varies with the amount of $H_2S$ present in the $H_2S$-rich carrier gas in line 12. The higher the concentration of $H_2S$-rich carrier gas in line 12 the lower the $H_2S$-lean carrier gas rate.

In first contacting stage 5, $H_2S$-rich liquid sulfur is partially degasified when contacted with the $H_2S$-lean carrier gas as will be discussed in more detail hereinbelow. The $H_2S$-rich liquid sulfur which is partially depleted in $H_2S$ content is then passed sequentially through contacting stages 5, 6, 7 and 8 via openings 2a and 3a, becoming progressively more depleted in $H_2S$ in each stage, until the desired $H_2S$ content of the sulfur is reached. The flow of liquid sulfur under rather than over the baffle arrangement has the advantage of permitting the progressive reduction in $H_2S$ content of the sulfur while minimizing backmixing and preserving the storage function of the sulfur pit. Although the $H_2S$-rich liquid sulfur can be degasified to any desired level, the $H_2S$-lean liquid sulfur should have an $H_2S$ content of less than 15 wppm to avoid generation of a combustible gas mixture when an oxygen-containing gas is in contact with the sulfur. If desired, however, the $H_2S$ content of the $H_2S$-lean liquid sulfur can be reduced to 10 wppm or less, to 5 wppm or less or even to 1 wppm or less by using the present invention. The $H_2S$-lean liquid sulfur is then passed into a collecting Section 9 where it is removed therefrom via line 13.

Similarly, the $H_2S$-lean carrier gas in line 11 passes successively through stages 8, 7, 6 and 5 via openings 2b and 3b, contacting the liquid sulfur present therein so as to become progressively more enriched by the $H_2S$ released from the liquid sulfur and finally exiting sulfur pit 1 as an $H_2S$-rich carrier gas via line 12. In addition to containing substantially the same components as present in the $H_2S$-lean carrier gas, the $H_2S$-rich carrier gas will also contain $H_2S$ and $SO_2$ removed from the liquid sulfur as well as sulfur in an amount corresponding to its vapor pressure at the temperature and pressure of the sulfur pit 1.

As noted above, the $H_2S$ concentration in the $H_2S$-rich carrier gas cannot exceed that established by equilibrium. The upper limit of $H_2S$ concentration in the $H_2S$-rich carrier gas should not exceed 3.6 volume %, corresponding to the inflammability threshold mentioned above, in the presence of an oxygen-containing gas. The lower limit will be determined by economic considerations since low levels of $H_2S$ therein require higher $H_2S$-lean carrier gas rates. In general, it is preferable to limit the amount of $H_2S$ in the $H_2S$-rich carrier gas to no more than 1 to 2 volume %, preferably between 0.5 and 1.5 volume %, during normal operations. The amount of carrier gas employed in the present continuous degasification process is less than that required in conventional batch processes because toward the end of the batch cycle, the gas above the liquid sulfur is sufficiently enriched in $H_2S$ that it must be diluted with large amounts of said gas to obtain the necessary driving force to remove sufficient $H_2S$ from the liquid sulfur so as to obtain low levels; i.e. less than 15 wppm, of $H_2S$ therein. Since the $H_2S$-rich carrier gas will be heated to the temperature of the sulfur in sulfur pit 1, it is desirable that the velocity of $H_2S$-rich carrier gas be such that the entrainment of liquid sulfur therein is minimized. It is also desirable to heat line 12 to prevent solidification on any sulfur entrained therein. Upon leaving sulfur pit 1, the $H_2S$-rich carrier gas may be disposed of, for example, by incineration.

Figure 2:
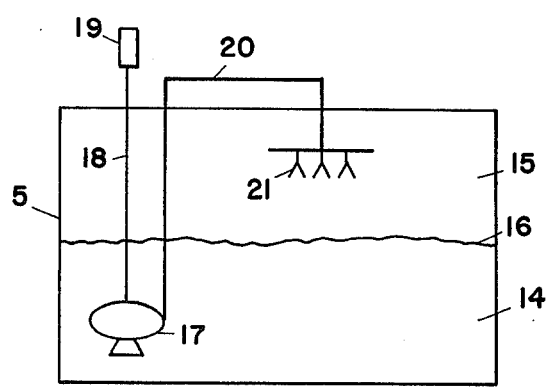
FIG. 2 diagrammatically depicts a side view of a single contacting stage.

FIG. 2 shows a single contacting stage, for example, first contacting stage 5, in which $H_2S$-rich liquid sulfur enters as described above and forms a liquid sulfur phase 14 in the lower portion of stage 5. The carrier gas is located in the upper portion 15 of stage 5 above the liquid sulfur phase 14 and is separated therefrom by interface 16. A pump 17 having a shaft 18 connected to motor 19 recirculates the liquid sulfur via line 20 and preferably through at least one spray nozzle 21 from which the sulfur is discharged in the form of a spray. The spray provides a large surface area for contact between the carrier gas and the $H_2S$-rich liquid sulfur to effect degasification of the latter. The pump, nozzle and motor are known articles of commerce and, as such, are readily available from equipment vendors. The sulfur recirculation rate is not critical and may range broadly, i.e. from about 1 to about 100 times the sulfur feed rate to each stage, depending upon the desired $H_2S$ content of the $H_2S$-lean liquid sulfur, the $H_2S$ content of the $H_2S$-rich sulfur and the number of contacting stages employed. Preferably, the sulfur recirculation rate will range from about 4 to 50, more preferably from about 4 to 10 times the sulfur feed rate to each stage. Preferably the sulfur is recirculated within at least one contacting stage and most preferably within each contacting stage. The number of contacting stages employed may range from 2 to 10 or more, preferably from 2 to 5 stages.

The liquid sulfur in the sulfur pit should be maintained within a temperature range of from about 120° C. and 160° C. to avoid the undesirable flow characteristics mentioned above. However, if the $H_2S$-rich liquid sulfur is at a temperature in excess of 160° C., it may be cooled to a suitable temperature prior to entering sulfur pit 1. Alternatively, a heat exchanger can be placed in line 20 of first contacting stage 5 to effect the cooling. Typically, the sulfur pit is operated at substantially atmospheric pressure.

The residence time of the liquid sulfur can range broadly depending upon the amount of $H_2S$ to be removed as well as the $H_2S$-lean carrier gas rate, the amount of $H_2S$ in the $H_2S$-rich carrier gas, and the like. Typically, however, the residence time will range from about 10 minutes to about 2 hours per stage. The residence time can be varied by allowing the level of liquid sulfur to vary. Such flexibility cannot be obtained with conventional batch processes. If the liquid sulfur is obtained from a Claus plant, it may be desirable to introduce at least a portion of the sulfur from the first stage condenser into contacting stage 5, at least a portion of the sulfur from the second stage condenser into second contacting stage 6 and at least a portion of the sulfur from the third stage condenser into third contacting stage 7. Thus, the sulfur from the first stage condenser, which is at a high temperature and hence has a higher equivalent $H_2S$ content than that from other condensers, will receive the longest residence time. Similarly, at least a portion of the carrier gas can be added to and/or withdrawn from other than the first or last stages respectively, i.e. at an intermediate stage.

If desired, ammonia may be added to the liquid sulfur. The ammonia acts as a catalyst during degasification of the sulfur and in particular helps to break the bonds between the molecules of the sulfur and of the $H_2S$. Because the liquid sulfur is at temperatures between about 120° and about 160° C. and since ammonium sulfide dissociates at temperatures above 118° C., there is little if any chemical reaction between the ammonia and the $H_2S$. Typically, the ammonia is added in amounts of less than 100 wppm.

Although the above description was based on the use of a sulfur pit handling the liquid sulfur effluent from a Claus plant, it should be understood that any suitable contacting zone may be employed. Suitable materials of construction of said contacting zone include concrete, acid resistant concrete, carbon steel and the like. Alloy materials may be used if an unusually corrosive atmosphere is present in the system.

What is claimed is:

1. A process for the degasification of $H_2S$-rich liquid sulfur which comprises (1) continuously introducing said sulfur into the first stage of a contacting zone containing more than one discrete contacting stage such that the sulfur occupies the lower portion of said contacting zone; (2) continuously introducing an $H_2S$-lean carrier gas into the upper portion of the first stage of said contacting zone such that said carrier gas is separated from the liquid sulfur by an interface; (3) continuously withdrawing $H_2S$-lean liquid sulfur depleted in $H_2S$ from the lower portion of a subsequent stage of said contacting zone; and (4) continuously withdrawing an $H_2S$-rich carrier gas from the upper portion of a subsequent stage of said contacting zone, the liquid sulfur within said contacting zone being maintained within a temperature range of from about 120° to about 160° C. as well as being recirculated within at least one discrete contacting stage at a rate of from about 1 to about 100 times the sulfur feed rate to said contacting stage.

2. The process of claim 1 wherein $H_2S$-lean liquid sulfur withdrawn from the contacting zone contains less than 15 wppm $H_2S$.

3. The process of claim 1 wherein the contacting zone is a sulfur pit which receives the effluent from a process which forms liquid sulfur from $H_2S$.

4. The process of claim 1 wherein the $H_2S$-rich liquid sulfur contains from about 70 to about 300 wppm $H_2S$.

5. The process of claim 1 wherein the contacting zone comprises 3 discrete contacting stages.

6. The process of claim 1 wherein the $H_2S$-lean carrier gas is free of $H_2S$.

7. The process of claim 1 wherein ammonia is added to the liquid sulfur.

8. A process for the degasification of $H_2S$-rich liquid sulfur which comprises (1) continuously introducing said sulfur into the first stage of a contacting zone containing more than one discrete contacting stage such that the sulfur occupies the lower portion of said contacting zone; (2) continuously introducing an $H_2S$-lean carrier gas into the upper portion of at least one subsequent stage of said contacting zone such that said carrier gas is separated from said liquid sulfur by an interface; (3) continuously withdrawing $H_2S$-lean liquid sulfur depleted in $H_2S$ from said lower portion of at least one subsequent stage of said contacting zone; and (4) continuously withdrawing at least a portion of an $H_2S$-rich carrier gas from said upper portion of said first stage of said contacting zone, the liquid sulfur within said contacting zone being maintained within a temperature range of from about 120° to about 160° C. and being recirculated within at least one discrete contacting stage at a rate of from about 1 to about 100 times the sulfur feed rate to said contacting stage.

9. The process of claim 8 wherein ammonia is added to the liquid sulfur.

10. The process of claim 8 wherein the contacting zone is a sulfur pit which receives the effluent from a process which forms liquid sulfur from $H_2S$.

11. The process of claim 8 wherein the $H_2S$-lean liquid sulfur contains less than 15 wppm $H_2S$.

12. The process of claim 8 wherein the $H_2S$-lean carrier gas is an inert gas or air.

13. The process of claim 8 wherein the contacting zone comprises three discrete contacting stages.

14. The process of claim 8 wherein the H$_2$S content in the H$_2$S-rich carrier gas is between 0.5 and 1.5 volume %.

15. The process of claim 8 wherein the H$_2$S-lean carrier gas of (2) is introduced and the H$_2$S-lean liquid sulfur of (3) is withdrawn from the last stage of said contacting zone.

* * * * *